United States Patent Office 3,558,317
Patented Jan. 26, 1971

3,558,317
STYRYLQUINOLINE/HALOGEN LIBERATING LIGHT SENSITIVE COMPOSITION FOR USE IN LASER RECORDING
Victor P. Petro, Brecksville, and Richard A. Fotland, Lyndhurst, Ohio, assignors to Horizons Incorporated, a division of Horizons Research Incorporated, a corporation of Ohio
No Drawing. Filed Jan. 8, 1968, Ser. No. 696,100
Int. Cl. G03c 1/72
U.S. Cl. 96—90                                6 Claims

ABSTRACT OF THE DISCLOSURE

A photosensitive composition consisting essentially of a mixture including
(1) a styrylquinoline, such as (4-p-dimethylamino-styrylquinoline)
(2) an activator ($CHI_3$ or $CBr_4$)
(3) a tertiary phenol (di-tert-butyl-cresol)
(4) a fog inhibitor (triarylstibine)
(5) a weak organic base (arylamine)
(6) a resin binder (polystyrene)
which composition is characterized by a photographic speed substantially equivalent to that of high resolution silver film used for laser recording and which is responsive to lasers exhibiting peak outputs in the region of 4000 A. to 5000 A.

---

The invention herein described was made in the course of or under a contract or subcontract thereunder, with The Systems Engineering Group, Air Force Systems Command.

This invention relates to a dry working high speed free radical photosensitive composition suitable for normal picture taking purposes and for reproduction purposes and which is peculiarly suited for response to lasers and for readout information can be read into the film with either a krypton ion laser exhibiting peak output in the region of 4000 A. or an argon ion laser exhibiting a peak output in the region of 4880 A. The color of the image produced is yellow-brown which permits the image to be read-out at high efficiency with the argon ion laser. At these read-in wavelengths, the photographic speed of the system to be described approximates that of high resolution silver film, normally used for this type of laser recording.

In U.S. Pat. No. 3,095,303 issued June 25, 1963, there are described photosensitive compositions based on a family of weakly colored dyes or dye progenitors, belonging to the class of styryl dye bases and their higher vinylene homologs, capable of producing intense colors of high brilliance with narrow spectral ranges of absorption when utilized as a photo system in combination with suitable organic halogen-containing compounds.

The present invention is an improvement on the invention described in the above mentioned patent, as a result of the incorporation in the composition described in the patent of several additional ingredients.

The invention will be better understood from a consideration of each of the ingredients in greater detail.

(1) THE STYRYL DYE BASE

The dye bases useful in the practice of this invention may be represented by the following general formula:

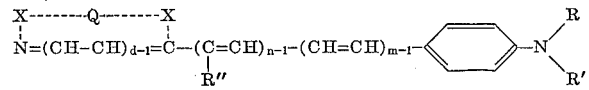

wherein R and R' each represent monovalent radicals selected from the group consisting of lower alkyl (i.e., methyl, ethyl, n-propyl) and benzyl, and may be the same as one another or different from one another; R'' represents a monovalent radical selected from the group consisting of H and —CN; $d$ and $n$ each represent a positive integer which is either 1 or 2; $m$ is a positive integer not greater than 3; and the sum of $n-1$ and $m-1$ is not greater than 2; and Q represents the nonmetallic atoms necessary to complete a heterocyclic nucleus necessary to complete heterocyclic compounds such as those listed in the United States Patent 3,095,303 noted above.

(2) THE ACTIVATOR

The activators useful in the present invention are compounds in which at least three halogen atoms are attached to a single carbon atom and are particularly sensitive in the photosystems of this invention. Compounds which have been found to be effective include those described in columns 4 and 5 of the above noted patent and particularly iodoform and analogues of iodoform in which alkyl, aryl or heterocyclic groups are substituted for the hydrogen in the iodoform. Suitable photolytically active organic halogen containing compounds are those selected from the group consisting of compounds capable of being split by absorption of light into free radical fragments consisting of halogen free radicals and organic free radicals, and selected from the group consisting of alkyl and aralkyl compounds in which at least three halogen atoms are attached to a single carbon atom.

(3) STABILIZERS

The preferred stabilizer in the compositions of this invention is di-t-butyl-cresol. Other tertiary phenols may be used in its place.

(4) FOG INHIBITOR

The fog inhibitors which are included in the compositions of the present invention are the triaryl compounds of Group V–B elements, namely, As, Bi, Sb and P. The triphenyl compounds are preferred and a particularly preferred compound is triphenylstibine.

(5) ORGANIC BASE

The compositions of this invention also include as an essential constituent a weak organic base which is either a secondary or tertiary arylamine, it being noted that the aryl groups attached to the amine nitrogen are required to be unsubstituted in order to be effective in the composition of this invention. Triphenyl amine and diphenyl amine are examples of two aryl amines which can be used in the composition of this invention.

(6) SUPPORT

The compositions of this invention may be supported in a paper base or dispersed in a film forming binder such as those described in the above noted patent. Polystyrene and copolymers of styrene and acetonitrile are particularly preferred as the film forming binders.

In the examples which follow the composition is prepared by adding the several ingredients to a solvent or mixture of solvents in the order in which they are listed in the examples and stirring as necessary to insure complete solution of the constituents. A solution is prepared under a safelight in the darkroom. Once the composition has been formulated, it is laid on subbed Mylar in a red light darkroom and after drying the film is then exposed to light (which may be ordinary light or laser light) which exhibits a significant portion of its energy output in a wavelength range between 3800 A. and 5500 A. A latent image is produced. The image is then developed out by exposure to red light for a suitable period whose short wavelength cutoff may be as low as 610 millimicrons, but preferably is not below 650 millimicrons, after which the film is fixed by heating.

EXAMPLE I

| | Milligrams |
|---|---|
| 4-(p-dimethylaminostyryl)-quinoline | 25–100 |
| 2,6-di-tert-butyl-p-cresol | 50–100 |
| Triphenylamine | 25–100 |
| Triphenylstibine | 0–50 |
| Iodoform | 100–400 |
| 10% polystyrene-benzene solution, 4 cc. | |

EXAMPLE II

| | Milligrams |
|---|---|
| 2-(p-dimethylaminostyryl)-quinoline | 25–100 |
| 2,6-di-tert-butyl-p-cresol | 50–100 |
| Triphenylamine | 25–100 |
| Triphenylstibine | 0–50 |
| Iodoform | 100–400 |
| 10% polystyrene-benzene solution, 4 cc. | |

EXAMPLE III

| | Milligrams |
|---|---|
| 2-[4-(p-dimethylaminophenyl)-1,3 - butadienyl] quinoline | 25–100 |
| 2,6-di-tert-butyl-p-cresol | 50–100 |
| Triphenylamine | 25–100 |
| Triphenylstibine | 0–50 |
| Iodoform | 100–400 |
| 10% polystyrene-benzene solution, 4 cc. | |

EXAMPLE IV

| | Milligrams |
|---|---|
| 4-[4-(p-dimethylaminophenyl)-1,3 - butadienyl] quinoline | 25–100 |
| 2,6-di-tert-butyl-p-cresol | 50–100 |
| Triphenylamine | 25–100 |
| Triphenylstibine | 0–50 |
| Iodoform | 100–400 |
| 10% polystyrene-benzene solution, 4 cc. | |

The invention will be better understood by comparison with the invention described in U.S. Pat. No. 3,095,303. It will be readily apparent that two important improvements have been made to the inventions described in that patent, namely (1) the incorporation of additional constituents in the photosensitive formula and (2) the use of optical development to achieve greatly increased photographic speeds as compared with those exhibited by the compositions described in the prior art.

As a result of the capability of producing a latent image by exposure to comparatively low dosages of radiation and the capability of optically developing an acceptable visible image from the latent image so-produced, a much more versatile, practical, dry working photographic film is available.

The magnitude of the improvement is clearly evident from a comparison of exposure times made in a camera as in Example I of U.S. Pat. 3,095,303 with the exposure of Example I in the present application. As stated in Example I of the patent, the composition "when exposed at f 4.5 in a camera gave excellent print-out images in 2.5 minutes, using near-noonday sun for illumination." This is illumination equivalent to approximately 4000 foot candles.

By comparison, exposure of the composition of the present invention (Example I) under the same illumination as in Example I of the patent for only *0.1 second* at f 4.5 yielded an excellent negative when optically developed.

Brief exposure followed by optical development when applied to the compositions described in U.S. Pat. 3,095,-303 is unsatisfactory because of the occurrence of premature fogging in the optical development step and an extremely low photographic speed.

Consequently, it is the incorporation of the additional constituents in the photosensitive compositions which produces compositions which can be optically developed without fogging prematurely and which, therefore, exhibit higher photographic speeds than those described in U.S. Pat. No. 3,095,303.

Depending on the specific constituents and whether or not mixtures of several dye bases and/or other constituents are used, the resulting image may have any desired color including black.

Having now described the invention it is not intended that it be limited except as may be required by the appended claims.

We claim:

1. A dry working non-silver photosensitive material which forms a latent image when photographically exposed and which forms a visible image when said latent image is exposed to additional radiation, which photosensitive material comprises:

(1) at least one dye base represented by the following general formula:

wherein R and R' each represent monovalent radicals selected from the group consisting of lower alkyl (i.e., methyl, ethyl, n-propyl) and benzyl, and may be the same as one another or different from one another; R" represents a monovalent radical selected from the group consisting of H and —CN; $d$ and $n$ each represent a positive integer which is either 1 or 2; $m$ is a positive integer not greater than 3; and the sum of $n-1$ and $m-1$ is not less than 1 and not greater than 2; and Q represents the nonmetallic atoms necessary to complete a heterocyclic nucleus;

(2) at least one photolytically active organic halogen containing compound selected from the group consisting of compounds capable of being split by absorption of light into free radical fragments consisting of halogen free radicals and organic free radicals, and selected from the group consisting of alkyl and aralkyl compounds in which at least three halogen atoms are attached to a single carbon atom;

(3) a substituted tertiary phenol in which at least one substituent has a fully substituted carbon atom;

(4) at least one triaryl compound of an element selected from the group consisting of As, Bi, Sb and P; and (5) at least one organic base selected from the group consisting of secondary and tertiary aryl amines, the aryl groups attached to the amine nitrogen being unsubstituted.

2. The photosensitive material of claim 1 wherein the halogen compound is iodoform.

3. The photosensitive material of claim 1 wherein the phenol is 2,6-di-tert-butyl-p-cresol.

4. The photosensitive material of claim 1 wherein the organic base is diphenylamine or triphenylamine.

5. The photosensitive material of claim 1 wherein the constituents are:
4-(p-dimethylaminostyryl)-quinoline
2,6-di-tert-butyl-p-cresol
triphenylamine
triphenylstibine
iodoform 6. The photosensitive material of claim 1 dispersed in a film forming binder.

References Cited

UNITED STATES PATENTS

| 3,042,515 | 7/1962 | Wainer | 96—90X |
| 3,095,303 | 6/1963 | Sprague et al. | 96—90X |
| 3,102,029 | 8/1963 | Fichter | 96—90 |
| 3,377,167 | 4/1968 | Fichter et al. | 96—90X |

NORMAN G. TORCHIN, Primary Examiner

R. E. FICHTER, Assistant Examiner